United States Patent
Gronitzki

(10) Patent No.: US 10,487,947 B2
(45) Date of Patent: Nov. 26, 2019

(54) NON-SYMMETRICAL SEAL RING

(71) Applicant: Saint-Gobain Performance Plastics L+S GMBH, Wertheim-Bettingen (DE)

(72) Inventor: Mirco Gronitzki, Wertheim (DE)

(73) Assignee: Saint-Gobain Performance Plastics L+S GMBH, Wertheim—Bettingen (DE)

( * ) Notice: Subject to any disclaimer, the term of this patent is extended or adjusted under 35 U.S.C. 154(b) by 128 days.

(21) Appl. No.: 15/464,404

(22) Filed: Mar. 21, 2017

(65) Prior Publication Data

US 2017/0268677 A1 Sep. 21, 2017

Related U.S. Application Data

(60) Provisional application No. 62/311,227, filed on Mar. 21, 2016.

(51) Int. Cl.
| | |
|---|---|
| *F16J 15/3284* | (2016.01) |
| *F16J 15/324* | (2016.01) |
| *F16J 15/3272* | (2016.01) |
| *F16J 15/44* | (2006.01) |

(52) U.S. Cl.
CPC ......... *F16J 15/3284* (2013.01); *F16J 15/324* (2013.01); *F16J 15/3272* (2013.01); *F16J 15/441* (2013.01)

(58) Field of Classification Search
CPC ...... F16J 15/324; F16J 15/3272; F16J 15/441; F16J 15/44; F16J 15/1544; F16J 15/3268
USPC ....................................................... 277/500
See application file for complete search history.

(56) References Cited

U.S. PATENT DOCUMENTS

| | | | | |
|---|---|---|---|---|
| 3,942,806 A | * | 3/1976 | Edlund | F16J 15/3204 277/589 |
| 5,050,892 A | * | 9/1991 | Kawai | F04B 39/042 277/436 |
| 6,962,343 B2 | * | 11/2005 | Abiko | F16J 9/14 277/434 |
| 7,341,256 B2 | * | 3/2008 | Nakaoka | F16J 15/441 277/496 |
| 7,523,944 B2 | * | 4/2009 | Hatori | F16J 15/441 277/460 |
| 2014/0008876 A1 | * | 1/2014 | Nagai | F16J 15/441 277/579 |
| 2014/0319779 A1 | * | 10/2014 | Nagai | F16J 15/002 277/500 |
| 2015/0008648 A1 | * | 1/2015 | Matsumoto | F16J 15/18 277/589 |

(Continued)

FOREIGN PATENT DOCUMENTS

DE 112013004454 T5 5/2015

OTHER PUBLICATIONS

International Search Report for PCT/EP2017/056692, dated Jun. 21, 2017, 1 page.

*Primary Examiner* — Nathan Cumar
(74) *Attorney, Agent, or Firm* — Abel Schillinger, LLP; Chi Suk Kim

(57) ABSTRACT

A seal assembly can include a shaft housing, a shaft disposed in the shaft housing, and a seal mechanism disposed in a circumferential groove of the shaft. The seal mechanism can include an annular seal having a hydrostatic pocket at its outer diameter. The seal mechanism can be free of a secondary seal element disposed between a wall of the circumferential groove and the annular seal.

19 Claims, 4 Drawing Sheets

(56) References Cited

U.S. PATENT DOCUMENTS

2015/0048574 A1\* 2/2015 Seki .................... F16J 15/3208
  277/589
2015/0204204 A1 7/2015 Kazunari et al.

\* cited by examiner

NON-SYMMETRICAL SEAL RING

CROSS-REFERENCE TO RELATED APPLICATION(S)

This application claims priority under 35 U.S.C. § 119(e) to U.S. Patent Application No. 62/311,227 entitled "NON-SYMMETRICAL SEAL RING," by Mirco Gronitzki, filed Mar. 21, 2016, which is assigned to the current assignee hereof and incorporated herein by reference in its entirety.

FIELD OF THE DISCLOSURE

The present disclosure relates to seals, and more particularly to seal rings having a non-symmetrical geometry to reduce wear.

RELATED ART

Seal rings can be used to prevent leakage from occurring within an annulus between two components. For example, a seal ring may be positioned in an annulus between a shaft and a bore to maintain different fluidic pressures or to separate different fluidic components on opposing sides of the seal. In certain instances, the seal ring geometry can provoke sliding at the seals side face, which can cause wear in an undesirable location. There exists a need for seal rings that can reduce such wear.

BRIEF DESCRIPTION OF THE DRAWINGS

Embodiments are illustrated by way of example and are not intended to be limited in the accompanying figures.

DETAILED DESCRIPTION

Figure 1:
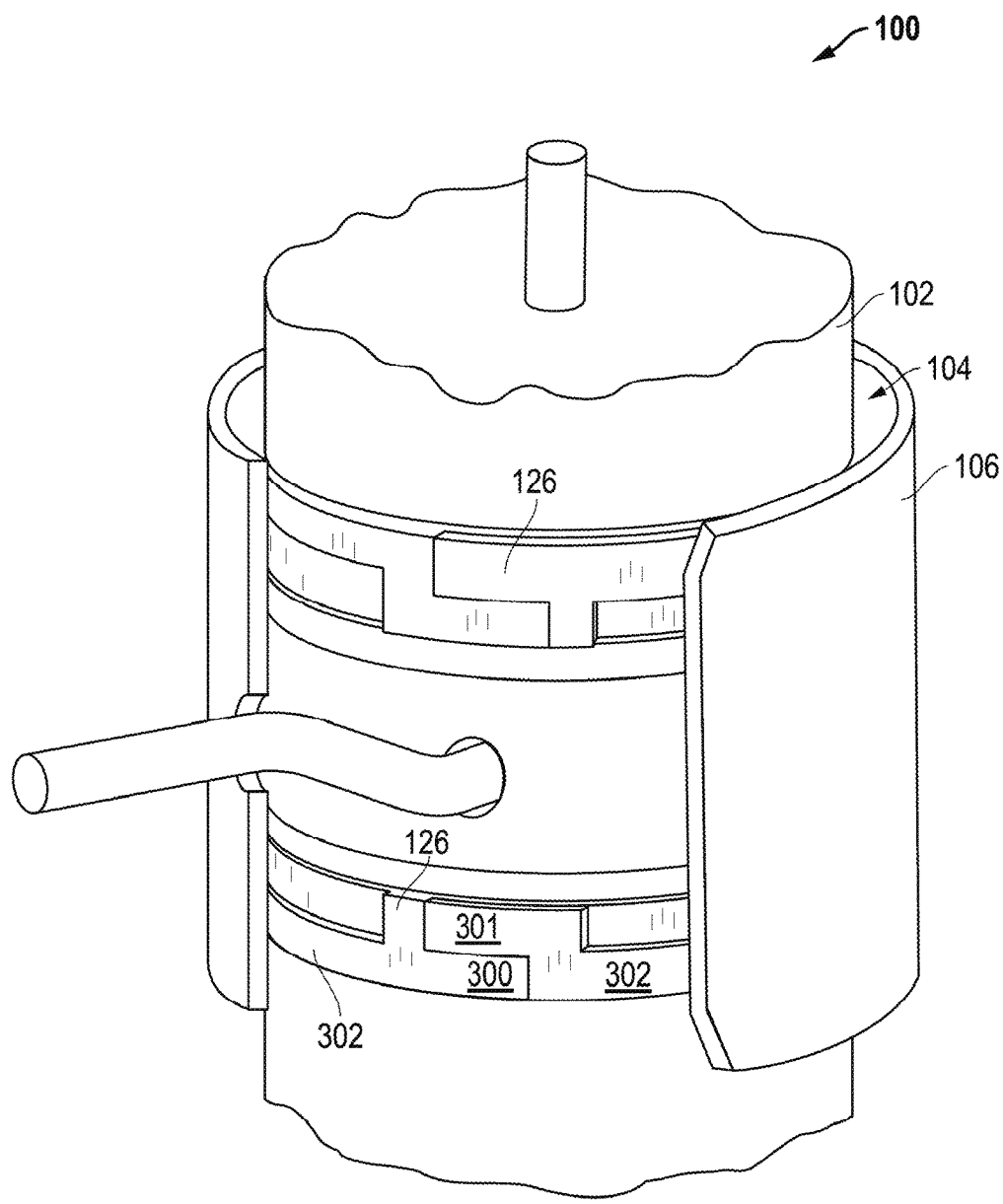
FIG. 1 includes an illustration of an assembly according to embodiments described herein.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

It is a particular advantage of certain embodiments of the seal ring described herein to reduce wear of a shaft, particularly when the shaft is formed of a soft material, such as a soft metal or an aluminum. In certain embodiments, a seal ring can include a non-symmetrical cross-section having a hydrostatic pocket at the outer surface. The hydrostatic pocket can include any pocket having a hydrostatic effect such as a biasing force to limit sliding at the side face. In further embodiments, the seal can further include a poka-yoke feature at the inner surface.

It is a particular advantage of certain embodiments of the seal ring described herein to include or achieve any of the above features without using a secondary seal element, such as an O-ring or a spring. For example, embodiments of the seal ring can be disposed within a seal assembly. In certain embodiments, the seal assembly can include a first component (e.g. a shaft), a second component (e.g. a housing), and the seal ring disposed between the first and second components. In particular embodiments, the seal assembly can be free of a secondary seal element, such as an O-ring or a spring. In more particular embodiments, the seal assembly can consist of only the first component, the second component, and the seal ring.

The concepts are better understood in view of the embodiments described below that illustrate and do not limit the scope of the present.

Referring initially to FIG. 1, an assembly 100 can generally include a first component 102 at least partially disposed within a bore 104 of a second component 106. The first and second components 102 and 106 can be rotationally or reciprocally translatable with respect to one another.

An annulus may be formed between the shaft and housing and be provided with one or more lubricious fluids, such as oil, to facilitate relative movement between the shaft and housing. In a particular instance, lubricious fluids may be introduced into the annulus through an opening in the housing, and circulated through the annulus, exiting through an opening in the shaft or through a second opening in the housing.

In certain embodiments, the first and second components 102 and 106 can include, or consist essentially of, different materials with respect to one another. For example, the first component 102 can include a first material and the second component 106 can include a second material different than the first material. In an embodiment, the first material can be less wear resistant than the second material. In another embodiment, the second material can be less wear resistant than the first material. In a particular embodiment, the first material can be a relatively soft metal, such as for example, an aluminum or an aluminum alloy, and the second material may be a relatively hard metal, such as for example, a steel or a steel alloy.

In particular embodiments, the first and second components 102 and 106 can be a shaft and a housing, respectively. While not intended to be limited thereto, one contemplated use for the assembly 100 is for vehicular transmissions, and more particularly to automatic transmissions incorporated into stop-start enabled vehicles whereby the engine is temporarily disengaged when the vehicle is at rest. The shaft may be a drive shaft insertable into a housing or body of the transmission assembly.

Further, the assembly 100 can include a seal ring 126 in accordance with one or more embodiments described herein. The seal ring 126 can be disposed between the first component 102 and the second component 106. The seal ring can have a generally rectangular body 128 having an outer surface 134, an inner surface 135, a first side surface 136, and a second side surface 137. Despite the generally rectangular shape of the body 128, the seal ring can have a non-symmetrical cross-section as discussed in more detail below.

Figure 2:
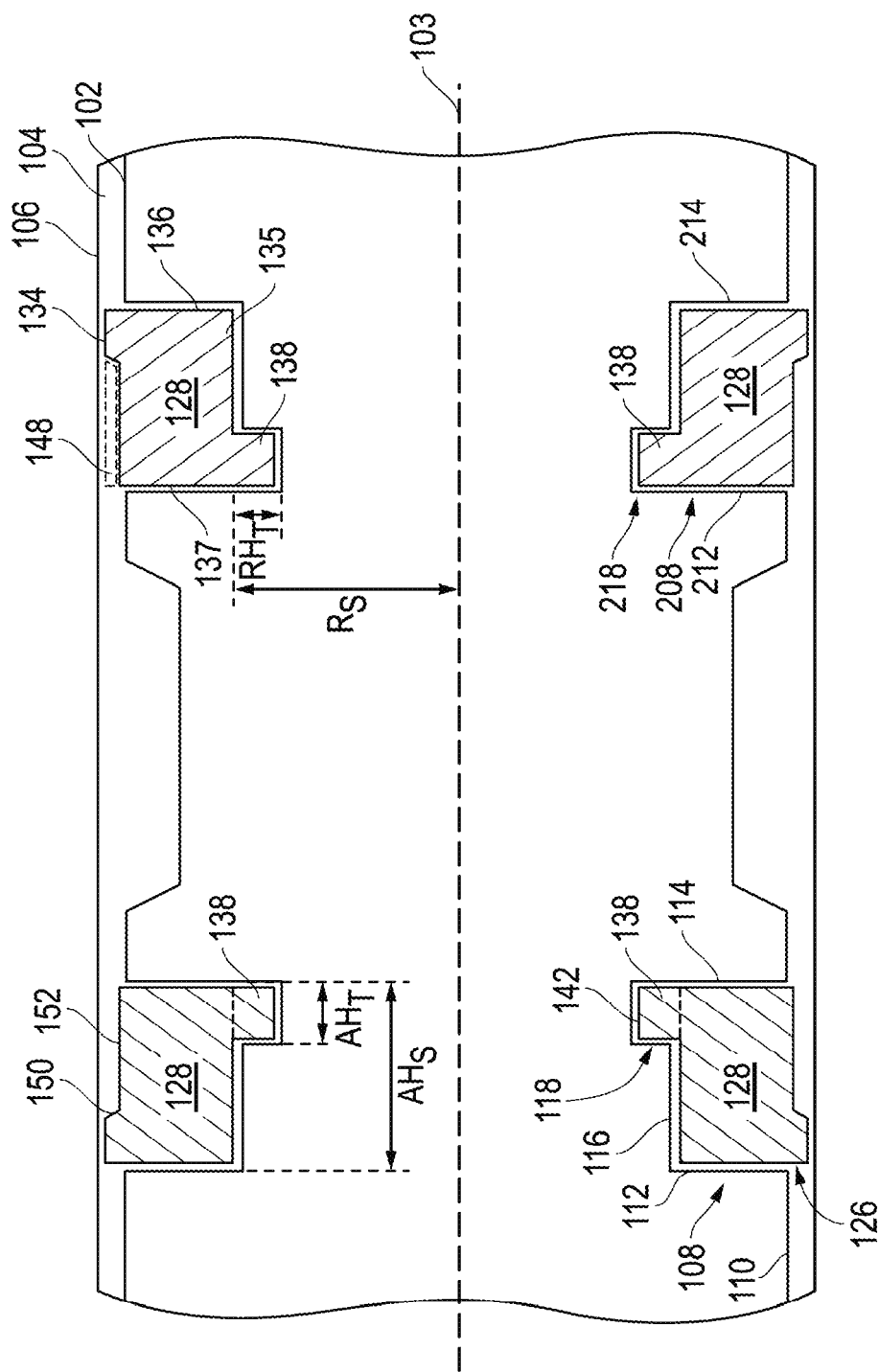
FIG. 2 includes an illustration of a cross-section of an assembly according to embodiments described herein.

FIG. 2 includes an illustration of a cross-section of the assembly 100 as seen perpendicular to an axis 103 of the first component 102. As discussed above, the seal ring 126 can have a non-symmetrical cross-section that includes a hydrostatic pocket 148 forming a relief portion in the outer surface 134 of the seal ring 126. In certain embodiments, the hydrostatic pocket 148 can enhance fluidic sealing of the assembly under operating conditions.

More particularly, the hydrostatic pocket 148, upon an increase in pressure, can generate a hydrostatic pressure urging the seal ring 126 into a suitable sealing position. For example, without being limited by theory, the configuration of the hydrostatic pocket can shift the balance of force at the inner and outer contact surfaces of the seal ring in a way that sliding at the side surfaces becomes negligible.

For certain rectangular seals, it is desirable to reduce drag torque created by the seal. This can be achieved by providing a cross section that provokes sliding at one of the side faces of the seal. However, for first components made of softer materials, such as soft metals, even aluminum, sliding at the side surface of the seal can cause wear and damage to the first component. On the other hand, in certain embodiments of the seal ring described herein, the hydrostatic pocket 148 at the outer diameter of the seal can shift the balance of force between dynamic mass torque ($T_C$) and friction torque ($T_F$) to limit the amount of sliding that occurs at the contact face of the first component by the side face of the seal ring. In other words, in certain embodiments, the seal ring 126 can rotate with the first component, instead of being fixed against the housing, and maintain the appropriate sealing functionality. In certain embodiments, the mechanism of certain embodiments of this disclosure can be described using the following formula:

$$\frac{T_C}{T_F} = \frac{3 \cdot r_a^2 \cdot b}{r_W^3 - (r_i + h_F)^3} \cdot \frac{\mu_C(G)}{\mu_F(G)}.$$

$$\frac{p_1 \cdot \left(\frac{b \cdot r_i + b_F \cdot h_F}{b \cdot r_a} - K_{Sp,C}\right) - p_{dyn,C} + \frac{F_z + F_{el}}{2\pi \cdot b \cdot r_a}}{p_1 \cdot \left(\frac{r_a^2 - (r_i + h_F)^2}{r_W^2 - (r_i + h_F)^2} - K_{Sp,F}\right) - p_{dyn,F}}$$

Figure 3:
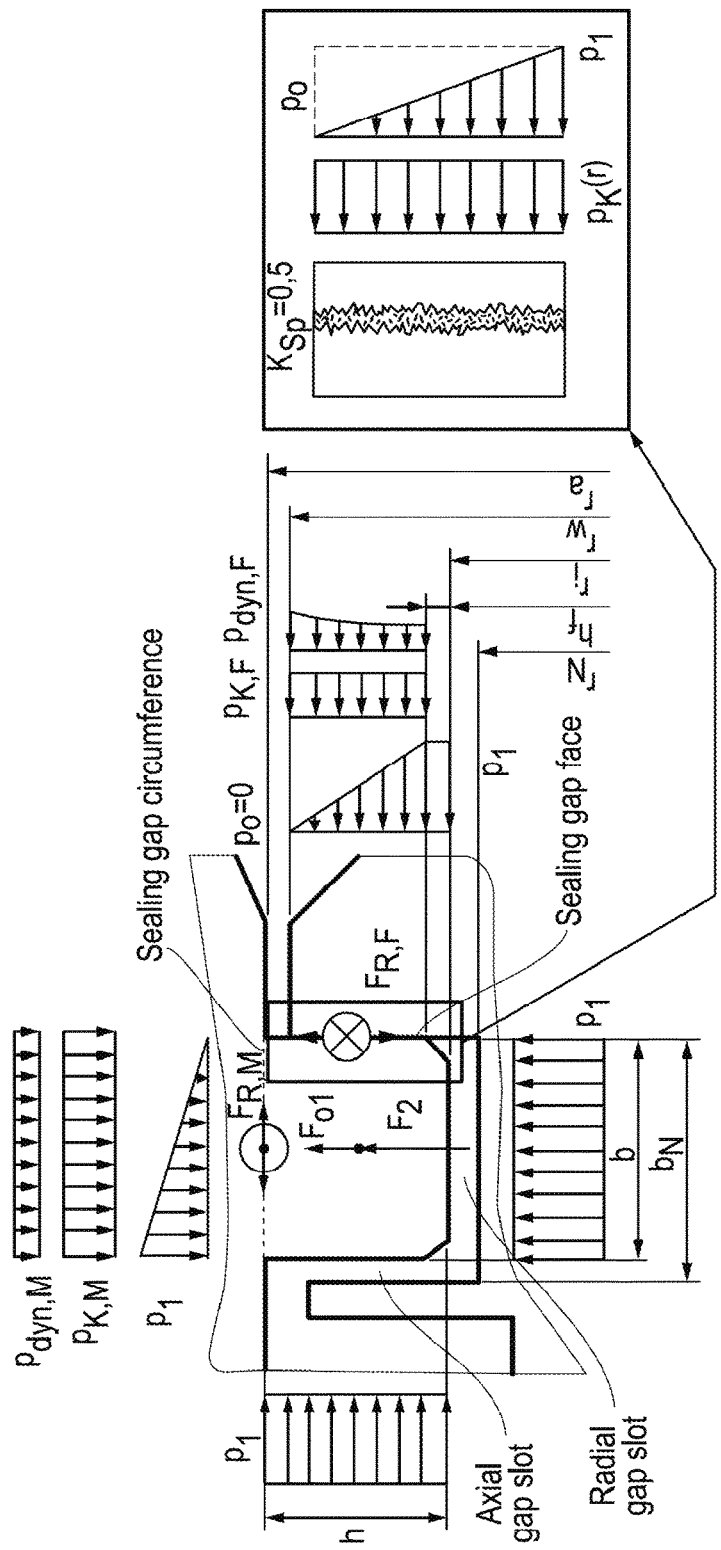
FIG. 3 includes a schematic of forces applied to the seal ring as described herein.

The particular variables are described in the diagram of FIG. 3.

In certain embodiments, the hydrostatic effect of the hydrostatic pocket can include a ratio of $M_M:M_F$ of no greater than 1, no greater than 0.98, no greater than 0.96, no greater than 0.94, no greater than 0.92, no greater than 0.9, no greater than 0.88, no greater than 0.86, no greater than 0.84, no greater than 0.82, or even no greater than 0.8. Further, the $M_M:M_F$ ratio can be at least 0.1, at least 0.2, or at least 0.3. Moreover, the $M_M:M_F$ ratio can include a value in a range of any of the above minimum and maximum values, such as in a range of 0.1 to 1, 0.2 to 0.9, or even 0.3 to 0.8.

In certain embodiments, the hydrostatic pocket 148 extends around a portion of the outer surface 134 of the seal ring 126. The hydrostatic pocket 148 may be defined by and extend between and edge of the seal ring and a side surface 150 contiguous with the outer surface 134 of the body 128. In particular embodiments, the outer surface 134 can include a base surface 152 defining a base of the hydrostatic pocket. The base surface 152 can be planar so as to form a right angle with the side surface 150. In another embodiment, the base surface 152 can include a stepped configured including at least two discrete steps. In yet another embodiment, the base surface 152 can be arcuate or otherwise non-linear.

In certain embodiments, the hydrostatic pocket 148 can extend uniformly around a portion of the circumference of the body 128. For example, the relief portion can extend around at least 70% of the circumference of the body, at least 80% of the circumference of the body, or at least 90% of the circumference of the body. In further embodiments, the relief portion can extend around 100% of the circumference of the body. However, the hydrostatic pocket 148 may be limited by the ends of the seal body. For example, the hydrostatic pocket may be no greater than 99.9% of the circumference of the body, no greater than 99.7% of circumference of the body, or no greater than 99.55% of the circumference of the body. Further, the relief portion can extend around the circumference in a range of any of the above minimum and maximum values, such as in a range of 70% to 99.9% of the circumference of the body, 80% to 99.7% of the circumference of the body, or 90% to 99.5% of the circumference of the body.

In certain embodiments, the hydrostatic pocket 148 can have an axial height, measured from the side surface 150 of the seal ring 126 to the opposite axial side of the relief portion, such as to the edge of the seal ring 126. The axial height of the relief portion can be at least 20% of the axial height of the seal ring, at least 30% of the axial height of the seal ring, or at least 40% of the axial height of the seal ring. In certain embodiments, the axial height of the relief portion may be no greater than 80% of the axial height of the seal ring, no greater than 70% of the axial height of the seal ring, or no greater than 60% of the axial height of the seal ring. Further, the axial height of the relief portion can be in a range of any of the above minimum and maximum values, such as in a range of 20% to 80% of the axial height of the seal ring, 30% to 70% of the axial height of the seal ring, or 40% to 80% of the axial height of the seal ring.

In certain embodiments, the hydrostatic pocket 148 can have a radial height, measured radially from the base surface 152 to the outer surface 134 of the seal ring 126. The radial height of the relief portion can be at least 5% of the radial height of the seal ring, at least 10% of the radial height of the seal ring, or at least 15% of the radial height of the seal ring. In certain embodiments, the radial height of the relief portion may be no greater than 40% of the radial height of the seal ring, no greater than 35% of the radial height of the seal ring, or no greater than 30% of the radial height of the seal ring. Further, the radial height of the relief portion can be in a range of any of the above minimum and maximum values, such as in a range of 5% to 40% of the radial height of the seal ring, 10% to 35% of the radial height of the seal ring, or 15% to 30% of the radial height of the seal ring.

Figure 4:
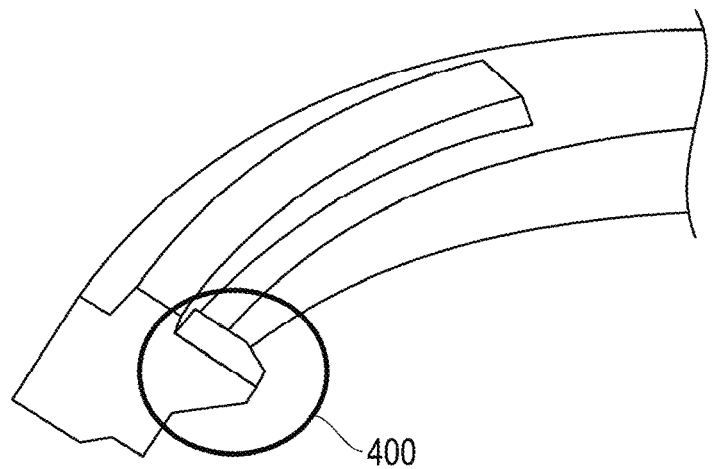
FIG. 4 includes an illustration of a poka-yoke according to an embodiment described herein.
Figure 5:
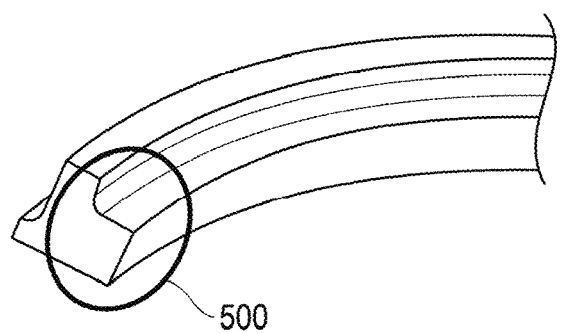
FIG. 5 includes an illustration of another poka-yoke feature according to an embodiment described herein.

In particular embodiments, the seal ring can have a tab 138 extending from the inner surface 135 that can assist with proper alignment within the shaft. The tab 138 can be an alignment tab forming the poka-yoke feature discussed earlier in the application. For example, the poka-yoke feature 400 illustrated in FIG. 4 or the poka-yoke feature 500 illustrated in FIG. 5. The tab 138 can extend from the body 128 radially inward beyond the inner surface 135 and axially beyond the first side surface 130. The tab 138 can be inserted into the notch 118 (described below) of the first component 102 to prevent rotation of the seal ring 126 relative to the first component 102. As illustrated, the tabs 138 of adjacent seal rings 126 can be oriented so as to face one another. In a non-illustrated embodiment, the tabs of adjacent seal rings can be oriented away from one another. In yet another non-illustrated embodiment, the tabs of adjacent seal rings can be oriented in the same direction as one another.

As illustrated, the tab 138 has an axial height, $H_T$, as measured in an axial direction of the seal ring 126. In a particular embodiment, $AH_T$ is less than an axial height, $AH_S$, of the inner surface 135 of the seal ring 126. For example, $AH_S/AH_T$ can be no greater than 0.9, or no greater than 0.8, or no greater than 0.7, or no greater than 0.6, or no greater than 0.5, or no greater than 0.45, or no greater than 0.4, or no greater than 0.35, or no greater than 0.3, or no greater than 0.35, or no greater than 0.3, or no greater than 0.25, or no greater than 0.2, or no greater than 0.15, or no greater than 0.1, or no greater than 0.05, or even no greater than 0.01. In an embodiment, $AH_S/AH_T$ is greater than 0.

In an embodiment, the tab 138 can have a maximum radial height, $RH_T$, as measured by a maximum distance the tab 138 extends beyond the inner surface 135 of the seal ring 126, that is less than a radius, $R_S$, of the seal ring 126, as measured from a central axis 140 of the seal ring 126 to the inner surface 135. In a particular embodiment, $R_S/RH_T$ can be no greater than 0.75, or no greater than 0.5, or no greater than 0.25, or no greater than 0.2, or no greater than 0.15, or no greater than 0.1, or no greater than 0.05, or even no greater than 0.01. In another particular embodiment, $R_S/H_T$ is greater than 0. While seal rings 126 with large $R_S/H_T$ ratios may have enhanced engagement relative to the first component 102, assembly thereof may require greater material flexing to align and insert the tab 138 into the notch 118 (described below).

In an embodiment, the tab 138 may be monolithic with the body 128 of the seal ring 126. In another embodiment, the tab 138 may include one or more discrete components coupled to the body 128, for example, by an adhesive, a threaded or non-threaded fastener, mechanical crimping, or any other suitable method.

In a particular embodiment, such as for example, as illustrated in FIG. 2, the tab 138 can include a major surface 142. By way of a non-limiting embodiment, the major surface 142 may be planar or arcuate. In an embodiment, the major surface 142 may be similar in shape to the shape of the notch 118 in the first component 102. That is, seal rings 126 being used with planar notches 118 may include planar major surfaces 142. Similarly, seal rings 126 being used with arcuate notches 118 or notches 118 having non-linear profiles may include arcuate, or otherwise non-linear, profiled major surfaces 142.

Referring again to FIG. 1, in certain embodiments, the seal ring 126 can include opposing ends 300 and 301. The opposing ends can have an axial height less than an axial height of the remaining middle portion 302 of the seal ring 126. The ends 300 and 301 can be complementary such that they can overlap to form a joint when installed in the groove of the first component. In particular embodiments, the relief portion 148 can extend along the middle portion 302 but terminate at or prior to reaching the ends 300 and 301.

The seal ring 126 may include any suitable material adapted to form a fluidic seal between components. As seal rings are known in the art, a comprehensive listing of materials is not provided. While not intended to be limited thereto, the seal ring 126 may include, for example, a grey cast iron ("GCI"), a polytetrafluoroethylene ("PTFE"), a poly ether ether ketone ("PEEK"), a polyimide ("PI"), a polyamide-imide ("PAI"), or any combination thereof. Fluoropolymers and other similar materials having low coefficients of friction are particularly well suited for those applications where the seal ring 126 is compressed in a radial direction and provides a radial biasing force between components. The seal ring 126 may be formed by any suitable manufacturing process or combination of manufacturing processes, including, for example, injection molding, extruding, machining, forging, or other similar process.

The seal ring 126 may be adapted to operate at temperatures of at least 100° C., such as at least 125° C., at least 150° C., at least 175° C., at least 200° C., at least 225° C., at least 250° C., at least 275° C., or even at least 300° C. Maximum operating temperatures may be less than 400° C., such as less than 375° C., less than 350° C., or even less than 325° C.

Referring again to FIG. 2, the first component 102 can include a groove 108 adapted to receive the seal ring. The groove 108 extending into the first component 102 a distance, as measured from an outer surface 110 of the first component 102. In an embodiment, the groove 108 can extend at least 1 mm into the first component 102, such as at least 2 mm, at least 3 mm, at least 5 mm, or even at least 10 mm. The groove 108 can extend from the surface 110 of the first component 102 no greater than 75% of the radius of the first component 102.

In an embodiment, the groove 108 can circumscribe the entire first component 102. That is, the groove 108 can extend around an entire circumference of the first component 102. In another embodiment, the groove 108 can extend around only a portion of the circumference of the first component 102.

In an embodiment, the groove 108 can have a generally polygonal cross section. For example, the groove 108 may be triangular, quadrilateral, pentagonal, hexagonal, heptagonal, or even octagonal. In a particular embodiment, the groove 108 is quadrilateral. In a more particular embodiment, the groove 108 may be rectangular, including two opposing side surfaces 112 and 114 and a base surface 116 connecting the two opposing side surfaces 112 and 114 together.

In an embodiment, the first component 102 can include a plurality of grooves 108 axially spaced apart from one another. For example, the first component 102 can include at least two grooves, or at least three grooves, or at least four grooves, or at least five grooves, or at least six grooves, or even at least seven grooves. In a particular embodiment, the first component 102 can include no more than 100 grooves, such as no more than 10 grooves.

In certain embodiments, a notch 118 can extend from the groove 108 radially into the first component 102. In an embodiment, the notch 118 can be in open communication with the groove 108. The notch 118 can extend in a generally axial direction away from one of the side surfaces 112 and 114 of the groove 108. In a non-illustrated embodiment, the notch 118 can also extend in a generally radial direction away from the base surface 116. In a particular instance, the notch 118 may have a same depth as the groove 108, as measured from the surface 110 of the first component 102.

In more particular embodiments, the notch is adapted to receive the alignment tab of the seal ring. For example, the notch 118 can receive the tab 138 and limit or prevent rotation of the seal ring 126 relative to the first component 102 or axial movement of the seal ring 126 relative to the first component 102. More particularly, the notch 118 can include opposing circumferential sidewalls 156 (only one sidewall is illustrated in FIG. 2) adapted to secure the tab 138 in the notch 118 and ensure proper alignment of the seal ring 126 with respect to the first component 102.

In certain embodiments, a notch 218 can extend from, and be in open communication with, a second groove 208 in the first component 102. The second groove 208 can extend in a generally radial direction away from a base surface 216 of the groove 208. The notch 218 can also extend in a generally axial direction away from one of the side surfaces 212 or 214 of the groove 208. As illustrated, the notch 218 may have a different depth as compared to the groove 208, as measured from the surface 110 of the first component 102. In a particular embodiment, the notch 218 can have a depth, as measured from the surface 110 of the first component 102, that is greater than the depth of the groove 208. The notch 218 can receive the tab of the seal ring to secure the tab 138 in the notch 218 and ensure proper alignment of the seal ring 126 with respect to the first component 102.

In certain embodiments, the assembly 100 can include a plurality of grooves 108, each groove 108 having one or more notches 118. In another embodiment, the assembly 100 can include a plurality of grooves 208, each groove 208 having one or more notches 218. In yet a further embodiment, the assembly 100 can include a plurality of grooves 108 and 208 and a plurality of notches 118 and 218 extending from the groves 108 and 208, respectively. As illustrated in FIG. 2, the notches 118 and 218 can extend from grooves 108 and 208, respectively, in the same direction. In further embodiment, the notches 118 and 218 can extend toward each other or away from one another.

In an embodiment, the body 128 of the seal ring 126 can have a width, $W_S$, as measured between first and second side surfaces 130 and 132, that is less than or equal to the width of the groove 108.

In certain embodiments, the first component 102 can include a recessed portion disposed between two grooves, as illustrated in FIGS. 1 and 2. While the grooves 108 are adapted to include a seal ring, as described herein, the recessed portion is not adapted to receive a seal ring but forms an outer surface 110 of the first component have an axial height less than the remaining portions of the first component.

For simplicity, the disclosure describes grooves 108 formed in only the first component 102. It is further contemplated that the second component 106 can include one or more grooves adapted to receive the seal ring 126. In this regard, the assembly 100 can be inverted such that the seal ring 126 engages with the second component 106 and is rotationally fixed thereto.

As discussed above, it is a particular advantage of the seal ring to achieve a balance between dynamic mass torque ($M_M$) and friction torque ($M_F$) to avoid sliding at the shaft contact face of the respective annular seal, particularly when the seal ring is disposed within a first component made from a soft material, such as an aluminum. This balance can be achieved, at least in part, based on one or more of the characteristics of the hydrostatic relief pocket described above.

Further, it is a particular advantage of the seal ring to achieve and maintain an alignment of the seal ring within the first component that enables the seal ring to achieve the desired balance between dynamic mass torque ($M_M$) and friction torque ($M_F$). This alignment can be achieved, at least in part, based on one or more of the characteristics of the tab of the seal ring and the notch of the groove of the first component described above.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. An assembly comprising:
a first component;
a second component;
at least one annular seal disposed between the first component and the second component;
wherein the annular seal comprises a non-symmetrical body having an inner surface facing the first component and an opposite outer surface facing the second component, the outer surface defining a hydrostatic pocket; and
wherein the inner surface of the first annular seal is directly adjacent the first component.

Embodiment 2. The seal assembly of embodiment 1, the at least one annular seal comprises a plurality of the annular seals.

Embodiment 3. The seal assembly of any one of the preceding embodiments, wherein the first component comprises at least one circumferential groove and the at least one annular seal is disposed within the at least one circumferential groove.

Embodiment 4. The seal assembly of any one of embodiments 2 and 3, wherein the at least one circumferential groove comprises a plurality of the circumferential grooves, each separated an axial distance from each other, wherein each of the plurality of annular seals is disposed in a separate circumferential groove.

Embodiment 5. The seal assembly of any one of embodiments 3 to 4, wherein each annular seal is directly adjacent a base surface of the circumferential groove.

Embodiment 6. The seal assembly of any one of the preceding embodiments, wherein each circumferential groove contains only a single seal element, the single seal element consisting of the annular seal.

Embodiment 7. The seal assembly of any one of the preceding embodiments, wherein the hydrostatic pocket is adapted to achieve a balance between dynamic mass torque ($M_M$) and friction torque ($M_F$) to avoid sliding at the shaft contact face of the respective annular seal.

Embodiment 8. The seal assembly of any one of the preceding embodiments, wherein the hydrostatic pocket extends about a portion of the circumference of the annular seal.

Embodiment 9. The seal assembly of any one of the preceding embodiments, wherein the hydrostatic pocket extends along a majority of the circumference of the respective seal.

Embodiment 10. The seal assembly of any one of the preceding embodiments, wherein the hydrostatic pocket extends from an edge an axial gap of the seal assembly.

Embodiment 11. The seal assembly of any one of embodiments 3 to 10, wherein the each circumferential groove includes a notch in a base surface of the circumferential groove.

Embodiment 12. The seal assembly of embodiment 11, wherein the notch extends along the circumference of the base surface of the circumferential groove.

Embodiment 13. The seal assembly of embodiment 12, wherein the notch extends along the entire circumference of the base surface of the circumferential groove.

Embodiment 14. The seal assembly of any one of embodiments 11 to 13, wherein each annular seal comprises a tab adapted to extend from the inner surface of the annular seal into the notch.

Embodiment 15. The seal assembly of embodiment 14, wherein the tab extends along a majority of the circumference of the annular seal.

Embodiment 16. The seal assembly of any one of the preceding embodiments, wherein the annular seal is a split seal having a first end and an opposite second end.

Embodiment 17. The seal assembly of embodiment 16, wherein the first and second ends are complementary such that the first and second ends form a joint when fully assembled.

Embodiment 18. The seal assembly of any one of embodiments 16 and 17, wherein the first end includes a protrusion having a reduced axial and/or radial height relative to the body of the annular seal.

Embodiment 19. The seal assembly of any one of embodiments 15 to 17, wherein the second end includes a protrusion having a reduced axial and/or radial height relative to the body of the annular seal.

Embodiment 20. The seal assembly of any one of the preceding embodiments, wherein the annular seal includes a polymer material.

Embodiment 21. The seal assembly of any one of the preceding embodiments, wherein the annular seal includes a polymer material comprising a gray cast iron ("GCI"), a polytetrafluoroethylene ("PTFE"), a poly ether ether ketone ("PEEK"), a polyimide ("PI"), a polyamide-imide ("PAI"), or any combination thereof.

Embodiment 22. The seal assembly of any one of the preceding embodiments, wherein the annular seal is adapted to operate at temperatures of at least 100° C., such as at least 125° C., at least 150° C., at least 175° C., at least 200° C., at least 225° C., at least 250° C., at least 275° C., or even at least 300° C.

Embodiment 23. The seal assembly of any one of the preceding embodiments, wherein the first component comprises a metal.

Embodiment 24. The seal assembly of any one of the preceding embodiments, wherein the second component comprises a metal.

Embodiment 25. The seal assembly of any one of embodiments 23 and 24, wherein the metal comprises a soft metal.

Embodiment 26. The seal assembly of any one of embodiments 23 to 35, wherein the metal of the first component comprises aluminum.

Embodiment 27. The seal assembly of any one of embodiments 23 to 26, wherein the metal of the second component comprises steel.

Embodiment 28. The seal assembly of any one of the preceding embodiments, wherein the assembly is adapted such that a lubricant disposed between the second component and the annular seal exerts sufficient force against the annular seal to reduce sliding between the annular seal and the first component.

Embodiment 29. The seal assembly of any one of the preceding embodiments, wherein the assembly is adapted such that a lubricant disposed between the second component and the annular seal exerts sufficient force against the annular seal to eliminate sliding between the annular seal and the first component.

Embodiment 30. The seal assembly of any one of the preceding embodiments, wherein the first component comprises a shaft.

Embodiment 31. The seal assembly of embodiment 30, wherein the shaft is a dynamic shaft.

Embodiment 32. The seal assembly of embodiment 31, wherein the shaft is drive shaft of a vehicular transmission.

Embodiment 33. The seal assembly of any one of the preceding embodiments, wherein the second component is a shaft housing.

Embodiment 34. The seal assembly of embodiment 33, wherein the shaft housing is a static shaft housing.

Embodiment 35. A vehicular transmission comprising the seal assembly of any one of the preceding embodiments.

Embodiment 36. The vehicular transmission of embodiment 35, wherein the transmission is an automatic transmission incorporated into stop-start enabled vehicles whereby the engine is temporarily disengaged when the vehicle is at rest.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. An assembly comprising:
a first component;
a second component;
at least one annular seal disposed between the first component and the second component;
wherein the annular seal comprises a non-symmetrical body having an inner surface facing the first component and an opposite outer surface facing the second component, the outer surface defining a hydrostatic pocket;
wherein the inner surface of the first annular seal is directly adjacent the first component, wherein the hydrostatic pocket forms a relief portion to the outer surface, wherein the hydrostatic pocket has an axial height, measured from a side surface of the seal ring to an opposite axial side of the relief portion, wherein the axial height is at least 20% of the axial height of the seal ring, wherein the first and second components are rotationally translatable with respect to one another; and
wherein the hydrostatic pocket achieves a balance between friction torque at a seal circumference and a seal side face to avoid sliding at a shaft contact face of the annular seal.

2. The seal assembly of claim 1, the at least one annular seal comprises a plurality of the annular seals.

3. The seal assembly of claim 1, wherein the first component comprises at least one circumferential groove and the at least one annular seal is disposed within the at least one circumferential groove.

4. The seal assembly of claim 1, wherein the first component comprises a plurality of the circumferential grooves, each separated an axial distance from each other, wherein each of the plurality of annular seals is disposed in a separate circumferential groove.

5. The seal assembly of claim 3, wherein each annular seal is directly adjacent a base surface of the circumferential groove.

6. The seal assembly of claim 3, wherein each circumferential groove contains only a single seal element, the single seal element consisting of the annular seal.

7. The seal assembly of claim 1, wherein the hydrostatic pocket extends about a portion of the circumference of the annular seal.

8. The seal assembly of claim 1, wherein the hydrostatic pocket extends along a majority of the circumference of the respective seal.

9. The seal assembly of claim 1, wherein the hydrostatic pocket extends from an edge an axial gap of the seal assembly.

10. The seal assembly of claim 3, wherein the each circumferential groove includes a notch in a base surface of the circumferential groove.

11. The seal assembly of claim 10, wherein the notch extends along the circumference of the base surface of the circumferential groove.

12. The seal assembly of claim 11, wherein the notch extends along the entire circumference of the base surface of the circumferential groove.

13. The seal assembly of claim 10, wherein each annular seal comprises a tab adapted to extend from the inner surface of the annular seal into the notch.

14. The seal assembly of claim 13, wherein the tab extends along a majority of the circumference of the annular seal.

15. The seal assembly of claim 1, wherein the annular seal is a split seal having a first end and an opposite second end.

16. The seal assembly of claim 15, wherein the first and second ends are complementary such that the first and second ends form a joint when fully assembled.

17. The seal assembly of claim 15, wherein the first end includes a protrusion having a reduced axial and/or radial height relative to the body of the annular seal.

18. The seal assembly of claim 15, wherein the second end includes a protrusion having a reduced axial and/or radial height relative to the body of the annular seal.

19. The seal assembly of claim 1, wherein the annular seal includes a polymer material.

* * * * *